(12) United States Patent
Park et al.

(10) Patent No.: US 6,667,792 B2
(45) Date of Patent: Dec. 23, 2003

(54) ARRAY SUBSTRATE WITH IDENTIFICATION MARK ON SEMICONDUCTOR LAYER AND IDENTIFICATION MARK FORMING METHOD THEREOF

(75) Inventors: Dug-Jin Park, Daegu (KR); Seong-Hee Kim, Gyeongsangbuk-do (KR); Hyun-Bae Kim, Daejon (KR)

(73) Assignee: LG. Philips LCD Co., Ltd., Seoul (KR)

( * ) Notice: Subject to any disclaimer, the term of this patent is extended or adjusted under 35 U.S.C. 154(b) by 66 days.

(21) Appl. No.: 10/029,175

(22) Filed: Dec. 28, 2001

(65) Prior Publication Data

US 2002/0085163 A1 Jul. 4, 2002

(30) Foreign Application Priority Data

Dec. 29, 2000 (KR) ......................................... 2000-86338

(51) Int. Cl.[7] .............................................. G02F 1/136
(52) U.S. Cl. ...................................................... 349/158
(58) Field of Search .......................... 349/158, 84, 106, 349/142

(56) References Cited

U.S. PATENT DOCUMENTS

| | | | | |
|---|---|---|---|---|
| 4,348,803 A | * | 9/1982 | Sasaki ........................ 438/479 |
| 5,361,150 A | * | 11/1994 | Noguchi ....................... 349/84 |
| 5,972,234 A | * | 10/1999 | Weng et al. ................... 216/44 |
| 6,597,427 B1 | * | 7/2003 | Katsu et al. ................. 349/192 |
| 2001/0022637 A1 | * | 9/2001 | Yu ............................. 349/102 |
| 2001/0048508 A1 | * | 12/2001 | Huang et al. .................. 355/1 |

* cited by examiner

Primary Examiner—Carl Whitehead, Jr.
Assistant Examiner—Stephen W. Smoot
(74) Attorney, Agent, or Firm—Morgan Lewis & Rockius LLP

(57) ABSTRACT

An array substrate for liquid crystal display devices includes a transparent substrate, a plurality of array cells on the transparent substrate, each of the array cells include a display area and a non-display area having a first identification, and a semiconductor layer including a second identification mark.

22 Claims, 6 Drawing Sheets

Forming a glass identification mark on a semi-conductor layer during an array element forming process ~ST11

Forming a panel identification mark for each array cell during a liquid crystal cell forming process ~ST22

ARRAY SUBSTRATE WITH IDENTIFICATION MARK ON SEMICONDUCTOR LAYER AND IDENTIFICATION MARK FORMING METHOD THEREOF

The present invention claims the benefit of Korean Patent Application No. 2000-86338, filed in Korea on Dec. 29, 2000, which is hereby incorporated by reference.

BACKGROUND OF THE INVENTION

1. Field of the Invention

The present invention relates to a liquid crystal display device, and more particularly, to an identification (ID) mark forming method of an array substrate for liquid crystal display devices.

2. Discussion of the Related Art

Liquid crystal display devices have become popular because of their low power consumption and superior portability. In general, a liquid crystal display device comprises a lower substrate that includes thin film transistors, commonly referred to as an array substrate, and an upper substrate that includes a color filter, commonly referred to as a color filter substrate, and a liquid crystal material disposed between the upper substrate and the lower substrate. The liquid crystal display device makes use of optical anisotropy and polarization properties of the liquid crystal material to display image data (images). Presently, active matrix LCD (AM LCD) devices are one of the most popular means for displaying images because of their high resolution and superiority in displaying moving images.

A plurality of gate lines, which receive scanning signals, and a plurality of data lines, which receive data signals, are disposed on the array substrate to define a plurality of pixel regions. A pixel electrode, which is connected to a thin film transistor, is formed in each pixel region to apply a voltage to the liquid crystal material. On the color filter substrate, a color filter, which includes sub-color filters R, G and B, that corresponds to the pixel region on the array substrate is formed on the color filter substrate. A black matrix is formed on the color filter to intercept light in a region other than the pixel electrode region, thereby preventing light from irradiating the corresponding thin film transistor. The color filter substrate further includes a common electrode that applies a voltage to the liquid crystal material.

The common electrode and the pixel electrode are respectively formed on internal opposing sides of the color filter substrate and the array substrate, respectively, with the liquid crystal material being disposed between the color filter substrate and the array substrate. The liquid crystal cell is completed by forming polarizing films on external sides of the color filter substrate and the array substrate. A light transmittance of the liquid crystal cell can be controlled by application of a voltage to the common electrode and the pixel electrode, thereby images are displayed using a light-shutter effect. When compared with a thin film transistor forming process and a color filter forming process, a liquid crystal cell forming process is simplified because it does not include repeated sub-processing steps. The complete process for forming the liquid crystal cell includes an alignment film forming process, a cell gap forming process, a liquid crystal injection process, a cell cutting process, and an inspection process. In addition way, a titling process that includes a process for making an identification mark on the array substrate is integrated into the forming process of the array substrate, thereby increasing efficiency of the automated processes for fabricating liquid crystal display devices.

Figure 1:
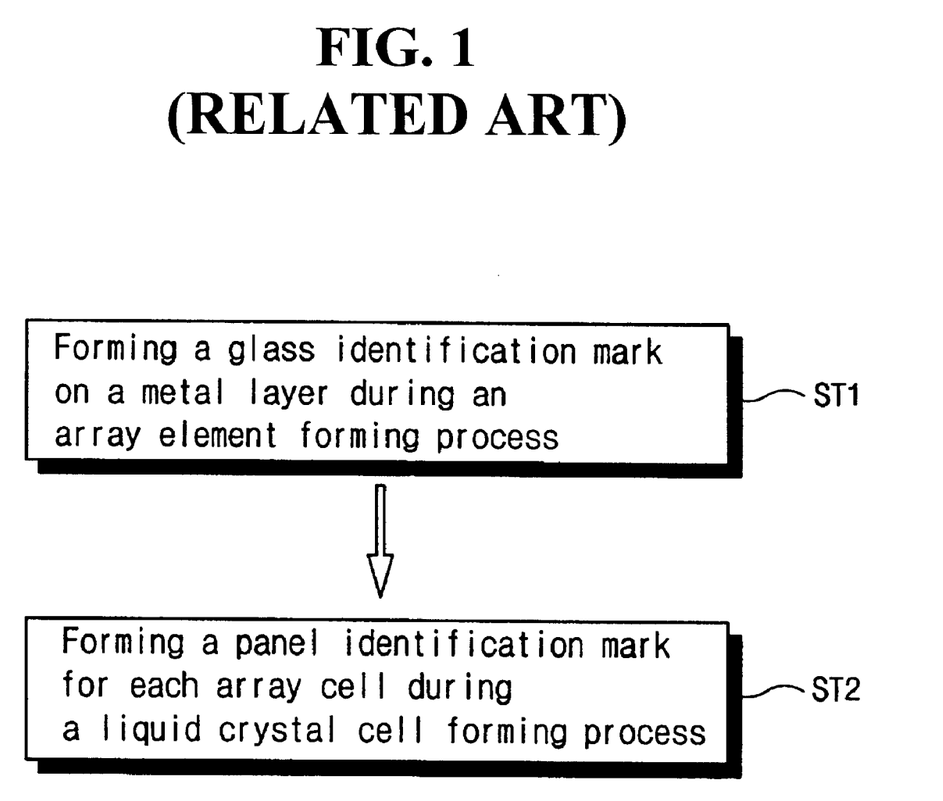
FIG. 1 is a flow chart showing an identification mark forming process for an array substrate of a liquid crystal display device according to the related art.

FIG. 1 is a flow chart showing an identification mark forming process of an array substrate for a liquid crystal display device according to the related art. In FIG. 1, a first step ST1 forms a glass identification mark on a metal layer during an array element forming process. The glass identification mark is formed on the array substrate during a gate line or a data line forming process, and is read by an Optical Character Reader (OCR) using a reflection or transmission detection method. A panel identification mark for each array cell on the array substrate is subsequently formed during a liquid crystal cell forming process, thereby preventing an increase in the total number of masks required during the array element forming process. A second step ST2 forms the panel identification mark for each array cell during the liquid crystal cell forming method. The panel identification mark is formed after a detection process of the glass identification mark, and is performed between the alignment film forming process and the cell gap forming process. Because the color filter substrate and the array substrate are to be assembled based on the array substrate, an additional identification mark forming process on the color filter substrate is not necessary. Accordingly, since the panel identification mark forming step is dependent upon the detection of the glass identification mark, the glass identification mark forming process effects an efficiency of the total process for fabricating the array substrate of the liquid crystal display device.

Figure 2:
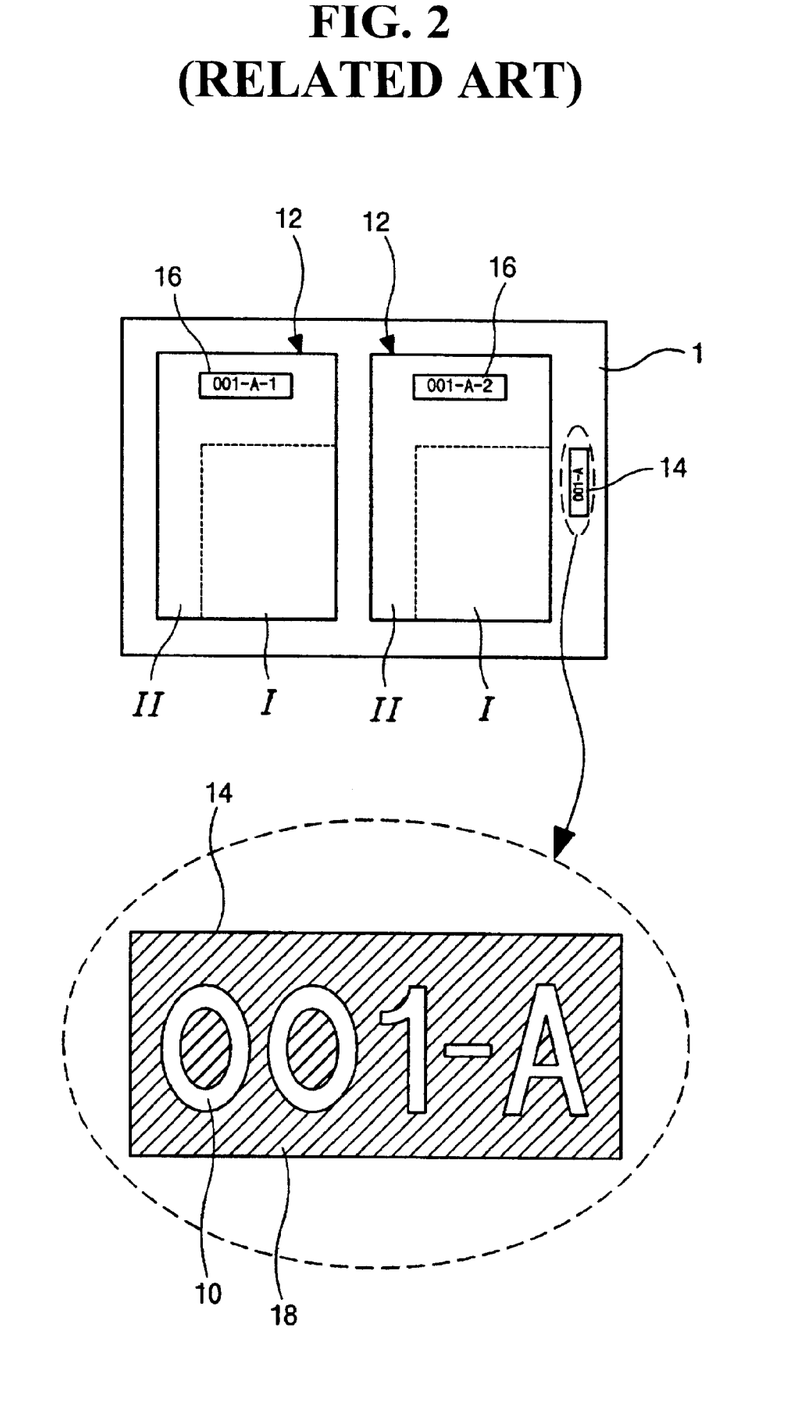
FIG. 2 is a plan view illustrating an array substrate of a liquid crystal display device with a glass identification mark on a metal layer according to the related art.

FIG. 2 is a plan view illustrating an array substrate of a liquid crystal display device with a glass identification mark on a metal layer according to the related art, and illustrates an example where two array cells are formed on a transparent substrate. In FIG. 2, array cells 12 having a display area I, and a non-display area II are formed on a transparent substrate 1. A panel identification mark 16 is formed on the non-display area II of the array cells 12, and the glass identification mark 14 is formed on a marginal blank portion of the transparent substrate 1. The glass identification mark 14 is formed using a metal layer during the forming process of the gate line (not shown) or the data line (not shown) of the array cells. As shown in an enlarged view of the glass identification mark 14, a set of identification characters 10 is formed in intaglio in the glass identification mark 14. The identification characters 10 are formed by removing a portion of the metal layer in a glass identification mark forming region on the transparent substrate 1. Additional portions of the metal layer remain in a portion 18 to surround the identification characters 10. Accordingly, the glass identification mark 14 can be detected during the detection process by transmission of light through the identification characters 10.

Figure 3:
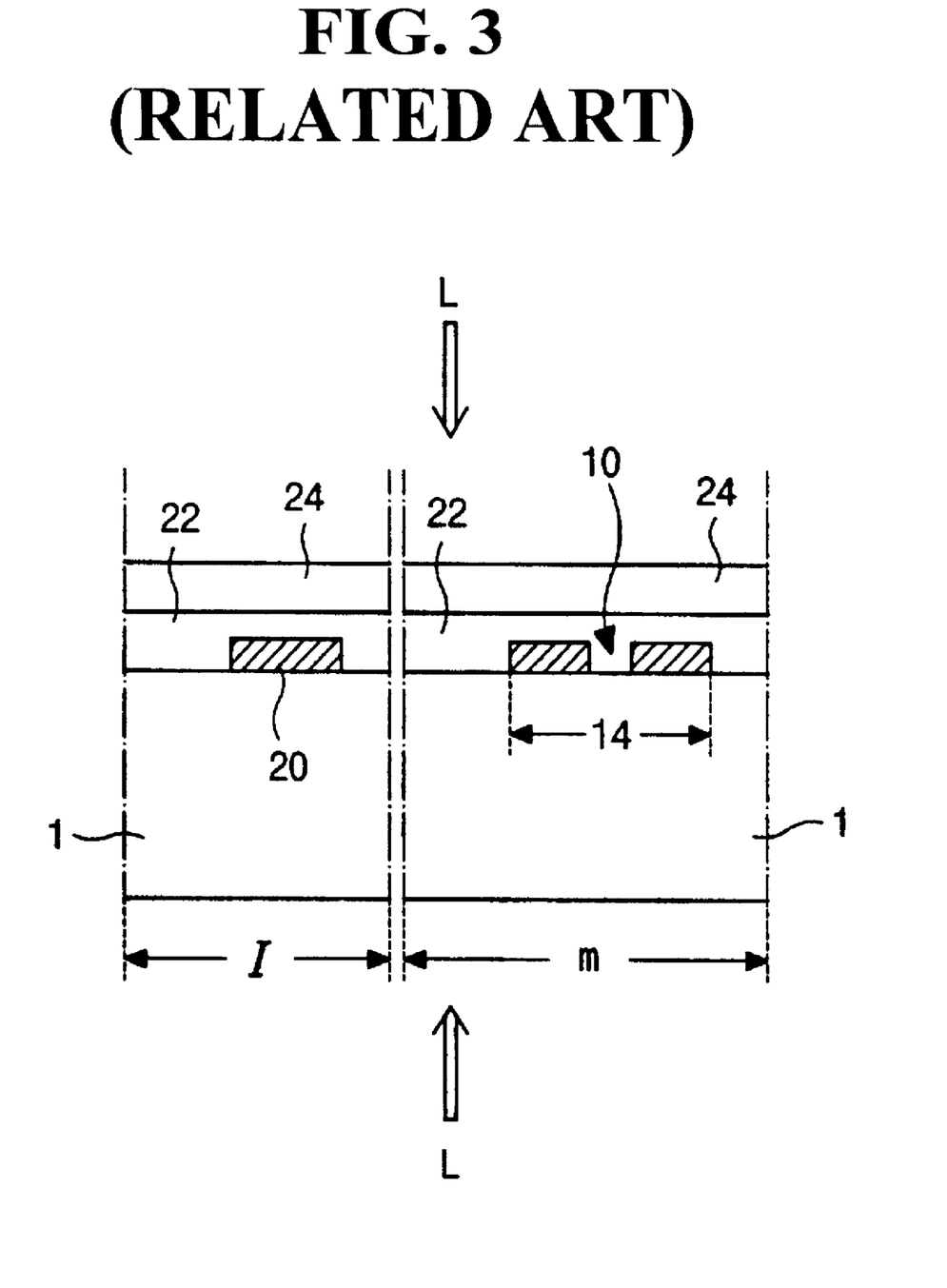
FIG. 3 is a cross-sectional view illustrating a display area of an array cell and a glass identification mark forming region of FIG. 2 according to the related art.

FIG. 3 is a cross-sectional view illustrating a display area I of the array cell, and a glass identification mark forming region, wherein a gate line 20 is formed in the display area I. In FIG. 3, the gate line 20 is formed on the transparent substrate 1, and the glass identification mark 14 is simultaneously formed of a same metal material as a material of the gate line 20 in the glass identification mark forming region "m" on the transparent substrate 1. A gate insulating layer 22 is formed on the gate line 20 and the glass identification mark 14, and a passivation layer 24 is formed on the gate insulating layer 22. Since only transparent materials are positioned over and under the identification characters 10, incident light along an "L" direction can transmit through the opened identification character portion, thereby the detection of the glass identification mark can be performed. An additional light exposing apparatus is necessary to create the identification characters 10 of the glass identification mark 14. Etching of exposed portions of the identification characters 10 is performed simultaneously with etching of the gate line 20. The etching process may include a wet etching process using a chemical solution or a dry etching process using a plasma gas. The wet etching process is advantageous for its low equipment costs and a high productivity, and the dry etching process is advantageous for its relatively short processing time and suitability for etching a minuscule pattern. In addition, since the dry etching process is performed in a vacuum chamber, the dry etching is far safer than the wet etching process. The wet etching process is generally used where a metal layer is to be etched to overcome a metal residue problem. However, since the wet etching process tends to over-etch patterns, it may decrease the productivity by causing an identification mark detection error that is caused by an over-etching of the identification mark.

SUMMARY OF THE INVENTION

Accordingly, the present invention is directed to an array substrate of a liquid crystal display device with identification mark and a identification mark forming method of the array substrate of the liquid crystal display device that substantially obviates one or more of problems due to limitations and disadvantages of the related art.

An object of the present invention is to provide an array substrate for liquid crystal display devices with an identification mark.

Another object of the present invention is to provide an identification mark forming method of the array substrate for liquid crystal display devices having a simplified process.

Another object of the present invention is to provide an identification mark forming method having increased productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for liquid crystal display devices includes a transparent substrate, a plurality of array cells on the transparent substrate, each of the array cells include a display area and a non-display area having a first identification, and a semiconductor layer including a second identification mark.

In another aspect, an identification mark forming method of an array substrate for liquid crystal display devices includes forming at least one array cell on a transparent substrate, the array cell including a gate line, a gate insulating layer, a transparent amorphous silicon layer, an opaque doped amorphous silicon layer, a data line, a display area, and a non-display area, forming a first identification mark on a marginal blank portion of the transparent substrate by etching the transparent amorphous silicon layer and the opaque doped amorphous silicon layer during an array element forming process, detecting the first identification mark, and forming a second identification mark on the non-display area of each of the at least one array cell after detecting the first identification mark.

In another aspect, an identification mark forming method includes forming at least one array cell on a transparent substrate, the array cell including a semiconductor layer, a display area, and a non-display area, forming a first identification mark on a marginal blank portion of the transparent substrate by etching the semiconductor layer, detecting the first identification mark, and forming a second identification mark on the non-display area of each of the at least one array cell after detecting the first identification mark.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which is illustrated in the accompanying drawings.

Figure 4:
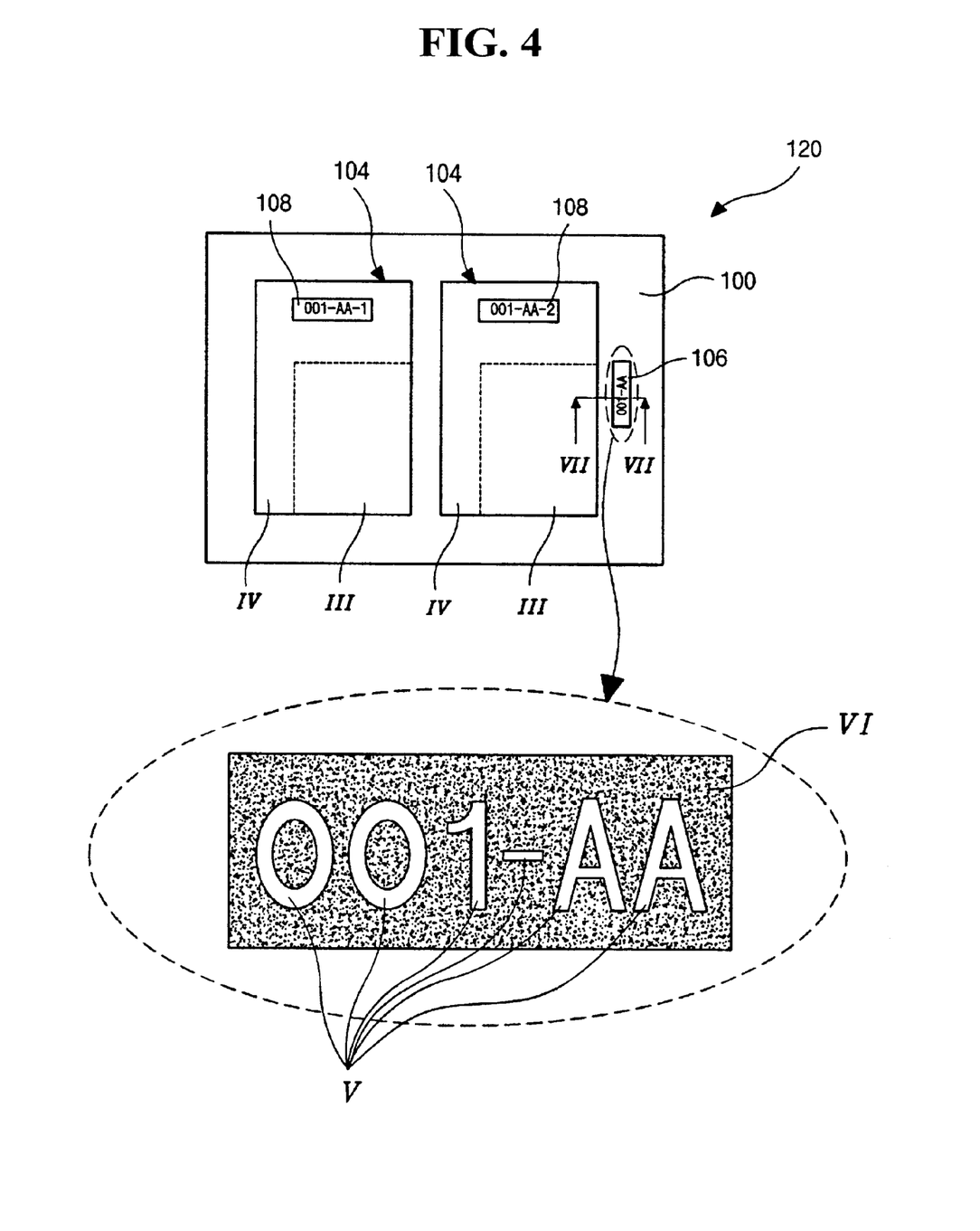
FIG. 4 is a plan view illustrating an exemplary array substrate of a liquid crystal display device with an identification mark on a semi-conductor layer according to the present invention.

FIG. 4 is a plan view illustrating an exemplary array substrate of a liquid crystal display device with an identification mark on a semiconductor layer according to the present invention. In FIG. 4, an array substrate 120 for a liquid crystal display device may include array cells 104 on a transparent substrate 100, and a glass identification mark 106 on a marginal blank portion of the transparent substrate 100. The array cells 104 may have a display area III and a non-display area IV. A panel identification mark 108 may be formed on the non-display area IV of the array cells 104, and each array cell may have a different panel identification mark 108. The glass identification mark 106 may be formed during an array element forming process using a photolithographic masking technique, for example, and the panel identification mark 108 may be formed based on the glass identification mark 106 after a detection process of the glass identification mark 106. The panel identification mark 108 may be formed on a shorting bar (not shown) by irradiating a laser onto the shorting bar. The shorting bar may be for a subsequent inspection process. As shown in an enlarged view of the glass identification mark 106, a set of identification characters "001-AA," for example, may be formed in intaglio in the glass identification mark 106. The glass identification mark 106 may be divided into two portions; a first portion may include identification characters V, and a second portion may including a portion VI surrounding the identification characters V. The glass identification mark 106 may be formed over a transparent amorphous silicon layer and an opaque doped amorphous silicon layer (n+a-Si). The identification characters V may be formed on the transparent amorphous silicon layer, and may be positioned away from the opaque doped amorphous silicon layer. The portion VI surrounding the identification characters V may be formed on the opaque doped amorphous silicon layer. When the identification characters V are imprinted in relief, the identification characters V should be formed on the opaque amorphous silicon layer, and the portion VI surrounding the identification characters V should be formed on the transparent amorphous silicon layer. Since the glass identification mark 106 may be formed by a dry etching process, for example, that is suitable for etching of a semiconductor layer, over-etching of the glass identification mark can be prevented.

Figure 5A:
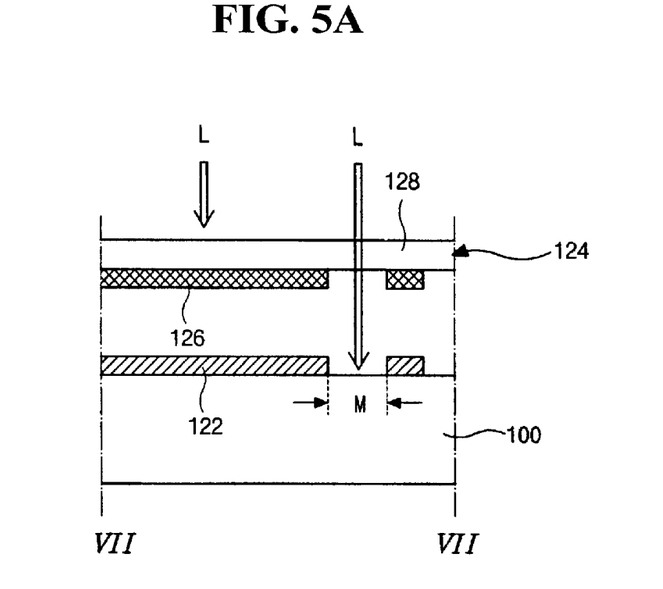
FIGS. 5A to 5B are cross-sectional views taken along VII—VII of FIG. 4 and illustrates an exemplary forming process of a glass identification mark.
Figure 5B:
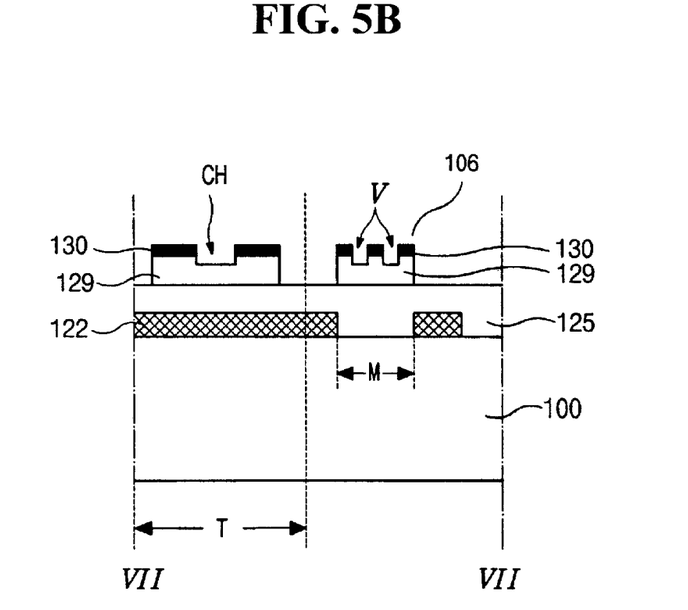

FIGS. 5A to 5B are cross-sectional views taken along VII—VII of FIG. 4, and illustrates an exemplary forming process of a glass identification mark. In FIG. 5A, a gate line 122 may be formed on a transparent substrate 100 using a photolithographic masking process, for example. A mask 124 may be used for the photolithographic masking process, and may include a light blocking portion 126 and a light transmission portion 128. A photo-resist layer used for the photolithographic masking process may include a positive or negative photoresist layer. The positive photoresist layer may be removed when exposed to light, and a thin film that has been previously formed under the positive photoresist may be removed during the photolithographic masking process. The positive photoresist layer may be used as an example in the instant embodiment of the present invention. Accordingly, only the thin film corresponding to the light blocking portion 126 may be patterned through an exposure and development process, for example. Accordingly, since a gate line forming region corresponds to the light blocking portion 126, and the glass identification mark forming region "M" corresponds to the light transmission portion 128, the metal layer in the glass identification mark forming region "M" is removed during the gate line forming process.

In FIG. 5B, a gate insulating layer 125 may be formed on the transparent substrate 100 and the gate line 122. A transparent amorphous silicon layer 129 and an opaque doped amorphous silicon layer 130 may be sequentially formed on the gate insulating layer 125. The laminated layers of the transparent amorphous silicon layer 129 and the opaque doped amorphous silicon layer 130 may undergo a photolithographic masking process, for example, to produce a channel "CH" of a thin film transistor "T" and the glass identification mark 106. The opaque doped amorphous silicon layer 130 formed in the identification character portion V of the glass identification mark 106 may be etched away. The etching process may be performed simultaneously with a process for forming the channel "CH". However, a titling apparatus (not shown) and an additional light exposing apparatus, may be positioned over the glass identification mark forming region "M" to form the identification characters. In a subsequent layer forming process, the glass identification mark 106 may be free from being covered with any opaque layer by positioning the light transmission portion 128 of the mask 124 of FIG. 5A over the glass identification mark forming region "M". In addition, a transparent layer, such as a passivation layer (not shown) or a transparent conductive material (not shown), may be formed over the glass identification mark 106.

Figure 6:
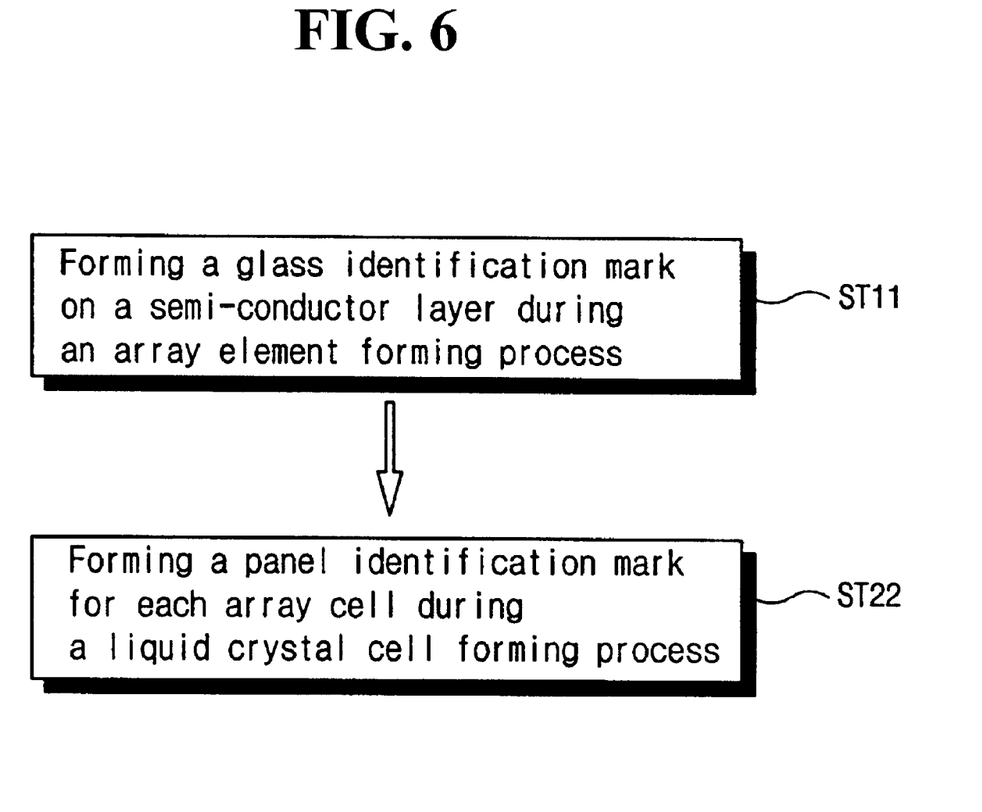
FIG. 6 is a flow chart showing an exemplary identification mark forming process for an array substrate of a liquid crystal display device according to the present invention.

FIG. 6 is a flow chart showing an exemplary identification mark forming process for the array substrate of a liquid crystal display device of FIG. 4 according to the present invention. In FIG. 6, a first step ST11 forms the glass identification mark 106 in FIG. 5B on the transparent amorphous silicon layer 129 and an opaque doped amorphous silicon layer 130 during an array element forming process. During the first step ST11, the gate line 122, the gate insulating layer 125, the transparent amorphous silicon layer 129, the opaque doped amorphous silicon layer 130, and a data line (not shown) may be sequentially formed on the transparent substrate 100, thereby simultaneously forming array cells 104 and the glass identification mark 106 in the marginal blank portion (not shown) of the transparent substrate 100 by etching the laminated transparent amorphous silicon layer 129 and the opaque doped amorphous silicon layer 130. The passivation layer (not shown) may further be formed over the laminated layers of the array cells and over the glass identification mark 106. The glass identification mark may be formed using a dry etching process. The gate insulating layer 125, the transparent amorphous silicon layer 129 and the opaque doped amorphous silicon layer 130 may be sequentially deposited with a single depositing apparatus using a Plasma Enhanced Chemical Vapor Deposition (PECVD), for example.

In FIG. 6, a second step ST22 forms the panel identification mark 108 for each of the array cells 104 in FIG. 4 during a liquid crystal cell forming process. During the second step ST22, the glass identification mark 106 may be detected, and the panel identification mark 108 may be formed on the non-display area IV of each of the array cells 104 on the basis of the result of the glass identification mark detection process. The glass identification mark 106 may be read by an Optical Character Reader (OCR). The panel identification mark 106 may be formed on the metal layer or the semiconductor layer using a laser marking apparatus, for example.

It will be apparent to those skilled in the art that various modifications and variation can be made in the array substrate for liquid crystal display devices with an identification mark and the identification mark forming method of the present invention without departing from the spirit or scope of the invention. Thus, it is intended that the present invention cover the modifications and variations of this invention provided they come within the scope of the appended claims and their equivalents.

What is claimed is:

1. An array substrate for liquid crystal display devices, comprising:
   a transparent substrate;
   a plurality of array cells on the transparent substrate, each of the array cells include a display area and a non-display area having a first identification; and
   a semiconductor layer engraved by an etching method so as to form a second identification mark.

2. The array substrate according to claim 1, wherein the semiconductor layer includes a transparent amorphous silicon layer and an opaque doped amorphous silicon layer.

3. The array substrate according to claim 2, wherein the opaque doped amorphous silicon layer is etched to form the second identification mark using a dry etching method.

4. The array substrate according to claim 1, wherein the semiconductor layer is positioned on a marginal blank portion of the transparent substrate.

5. The array substrate according to claim 1, further comprising a first transparent layer between the transparent substrate and the semiconductor layer.

6. The array substrate according to claim 5, further comprising a second transparent layer over the semiconductor layer.

7. An identification mark forming method of an array substrate for liquid crystal display devices, comprising:

forming at least one array cell on a transparent substrate, the array cell including a gate line, a gate insulating layer, a transparent amorphous silicon layer, an opaque doped amorphous silicon layer, a data line, a display area, and a non-display area;

forming a first identification mark on a marginal blank portion of the transparent substrate by etching the transparent amorphous silicon layer and the opaque doped amorphous silicon layer during an array element forming process;

detecting the first identification mark; and forming a second identification mark on the non-display area of each of the at least one array cell after detecting the first identification mark.

8. The method according to claim 7, wherein the gate insulating layer is disposed under the transparent amorphous silicon layer.

9. The method according to claim 7, further including a step of forming a transparent passivation layer over the at least one array cell and over the first identification mark.

10. The method according to claim 7, wherein the first identification mark is formed by etching the transparent amorphous silicon layer and the opaque doped amorphous silicon layer using a dry etching method.

11. The method according to claim 7, wherein the gate insulating layer, the transparent amorphous silicon layer and the opaque doped amorphous silicon layer are sequentially deposited using a single deposition apparatus.

12. The method according to claim 11, wherein the single deposition apparatus includes a plasma enhanced chemical vapor deposition apparatus.

13. The method according to claim 7, wherein the detection of the first identification mark is performed using an optical character reader.

14. The method according to claim 7, wherein the second identification mark is formed using a laser marking apparatus.

15. An identification mark forming method, comprising:

forming at least one array cell on a transparent substrate, the array cell including a semiconductor layer, a display area, and a non-display area;

forming a first identification mark on a marginal blank portion of the transparent substrate by etching the semiconductor layer;

detecting the first identification mark; and forming a second identification mark on the non-display area of each of the at least one array cell after detecting the first identification mark.

16. The method according to claim 15, wherein the semiconductor layer includes a transparent amorphous silicon layer and an opaque doped amorphous silicon layer.

17. The method according to claim 16, wherein a gate insulating layer is disposed under the transparent amorphous silicon layer.

18. The method according to claim 17, wherein the gate insulating layer, the transparent amorphous silicon layer and the opaque doped amorphous silicon layer are sequentially deposited using a single deposition apparatus.

19. The method according to claim 18, wherein the single deposition apparatus includes a plasma enhanced chemical vapor deposition apparatus.

20. The method according to claim 15, further including a step of forming a transparent passivation layer over the at least one array cell and over the first identification mark.

21. The method according to claim 15, wherein the detection of the first identification mark is performed using an optical character reader.

22. The method according to claim 15, wherein the second identification mark is formed using a laser marking apparatus.

* * * * *